April 29, 1952     C. E. NAGEL     2,595,201
SELF-LOCKING NUT
Filed Oct. 10, 1946     2 SHEETS—SHEET 1
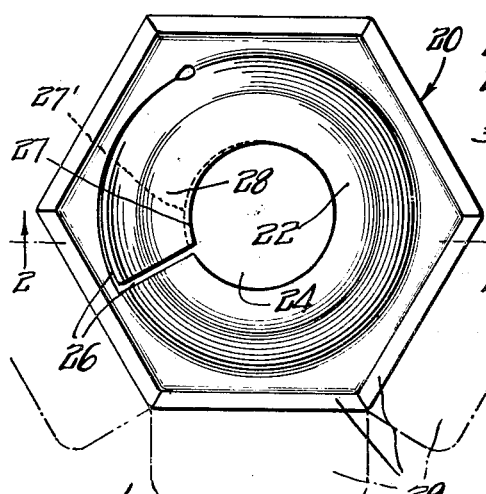
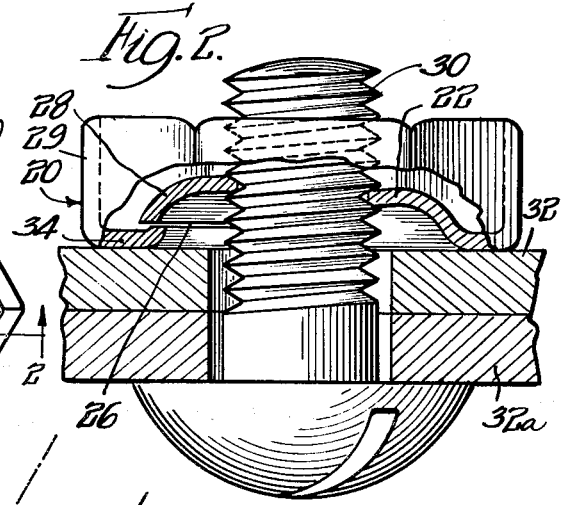
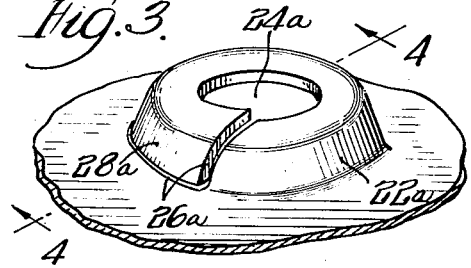
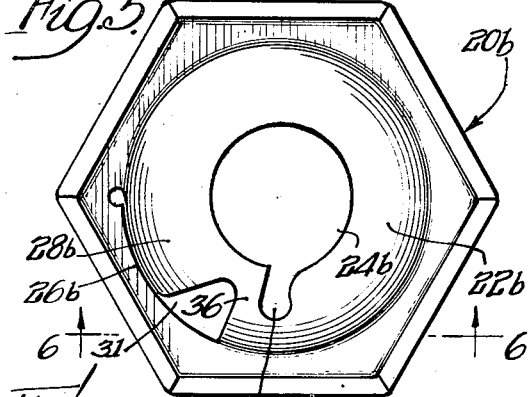
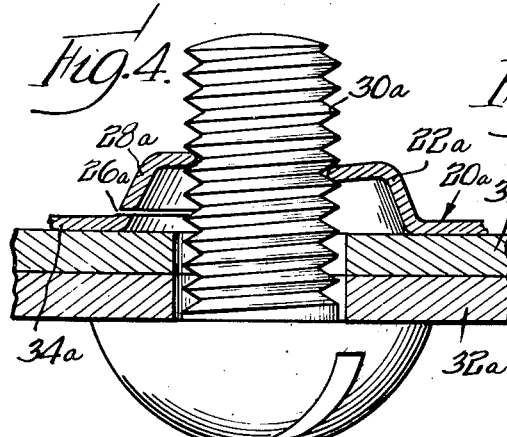
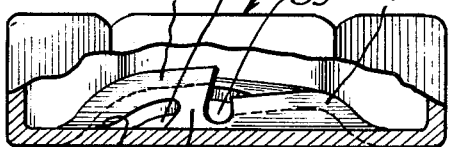
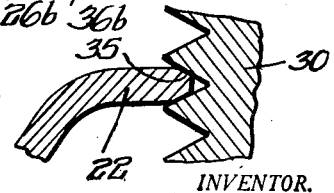
INVENTOR.
Charles E. Nagel
BY
Moore, Olson & Heide
attys.

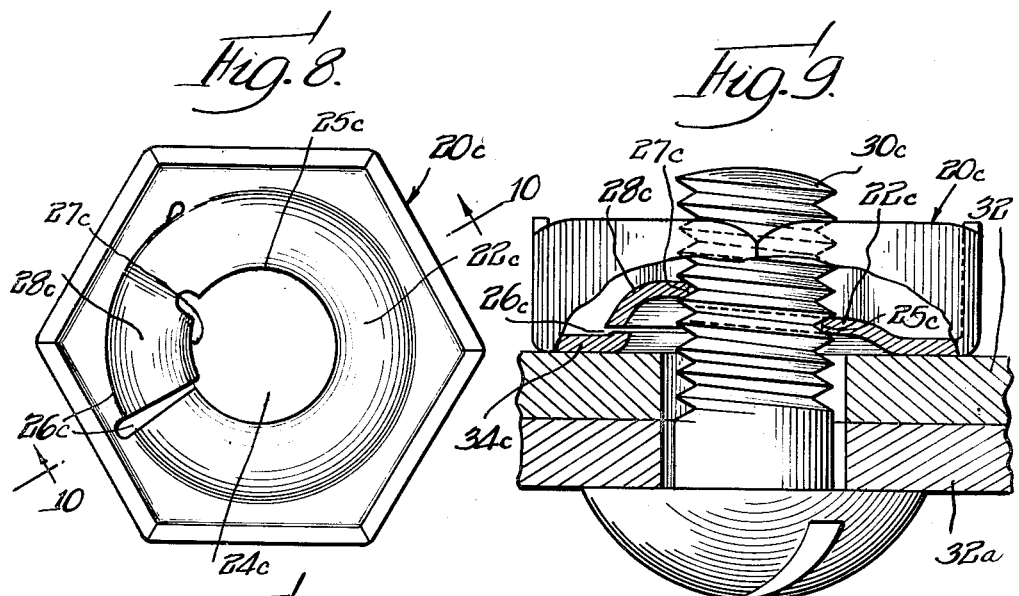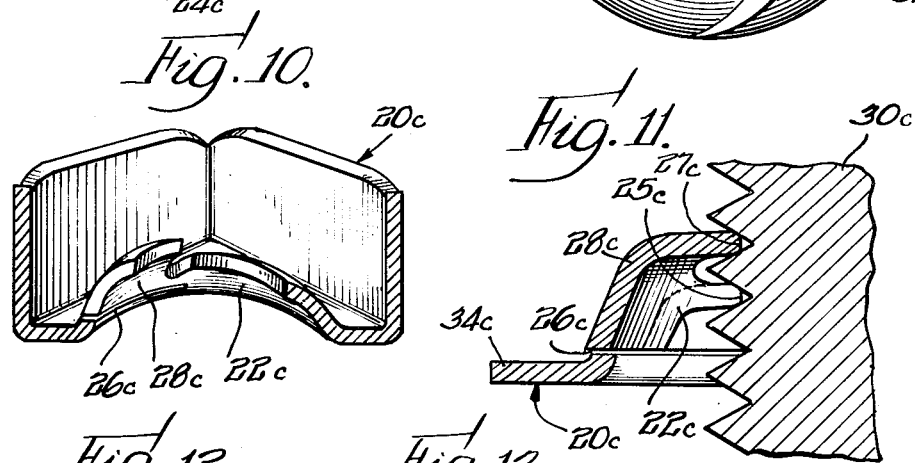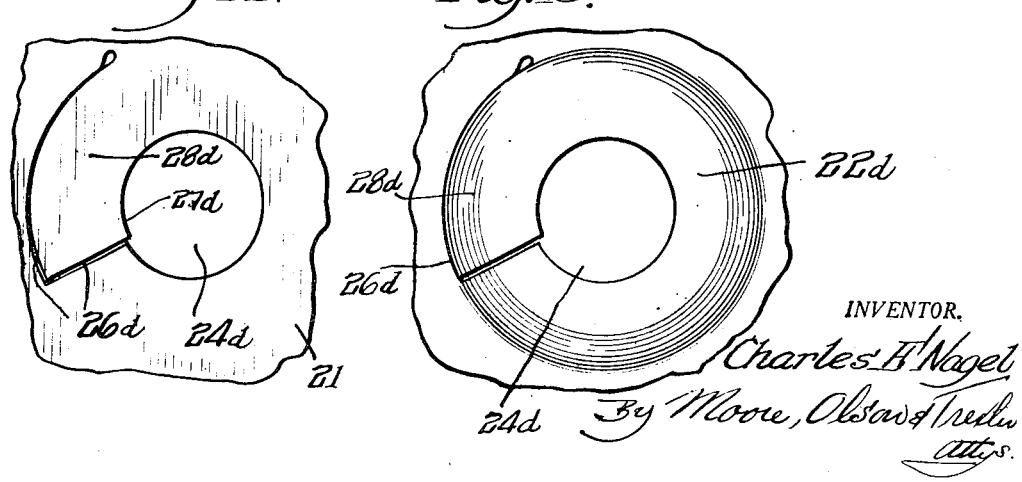

Patented Apr. 29, 1952

2,595,201

UNITED STATES PATENT OFFICE 2,595,201

SELF-LOCKING NUT

Charles E. Nagel, New York, N. Y., assignor to Illinois Tool Works, Chicago, Ill., a corporation of Illinois Application October 10, 1946, Serial No. 702,480

3 Claims. (Cl. 151—21)

The present invention relates in general to self-locking nuts and, in particular, to an improved form of self-locking nut which is adapted to lockingly engage thread convolutions on a complementary screw and thereby serve as a stop nut.

Self-locking nuts formed of sheet metal have been provided heretofore. Certain of these prior forms of self-locking nuts have been arranged to be deformed to forcibly grip the screw members to which they are applied upon engagement with work surfaces extending normally to the axis of the screw members. Other prior forms of self-locking nuts have been arranged to bite into the thread surfaces of screw members to which they are applied upon attempted loosening of the nuts. The principal objections to the prior constructions noted is that such nuts damage the screw members or the work surfaces which they engage, and in many instances cannot be removed intact, at least not without the aid of special tools. The self-locking nut of the present invention overcomes these objections through the provision of an arcuate resilient locking arm which frictionally engages the thread surface of a screw member to which the nut is applied over a circumferential arc of substantial extent, and is adapted to be flexed radially outward as an incident to application of the nut to the screw member, to provide a firm locking action without damaging the screw thread. The locking engagement of this nut with a screw does not depend upon engagement of the nut with surfaces other than the thread surface of the screw member.

It is an object of the present invention to provide an improved self-locking nut which can be economically made of sheet material and which can be repeatedly applied to and removed from a screw without damage to the threads thereof and without impairing the locking effectiveness of the nut.

A further object of the invention is to provide an improved self-locking nut of the type described wherein the locking action is uniform for either direction of rotation of the nut on a screw member and wherein said locking action is not dependent upon the engagement of the nut with a work surface other than the thread surface of the screw member.

Another object of the invention is to provide an improved nut having a locking arm which is flexible in a radial direction, and which engages a screw thread on which the nut is applied over a circumferential arc of considerable length in order to provide a firm locking action without danger of injuring the threads of such screw.

Still another object of the invention is to provide an improved self-locking nut in accordance with the preceding objects wherein the locking arm is displaced axially from the remaining thread engaging portion of the nut in order to facilitate application of the nut to a screw.

A still further object of the invention is to provide a nut in accordance with the preceding objects, wherein the locking arm is formed as a part of a cup-shaped body portion of the nut, which design provides the locking arm with a desired degree of resistance in both radial and axial directions.

The above and other objects of the invention will be more fully understood upon a consideration of the following specification, and the accompanying drawings, wherein:

Fig. 1 is a plan view of one embodiment of the invention;

Fig. 2 is a side view of the nut shown in Fig. 1 applied to a screw, with portions of the side walls of the nut broken away to illustrate the manner in which the threads of a screw are lockingly engaged by the body portion of the nut;

Fig. 3 is a fragmentary perspective view of a nut having a cup-shaped body portion similar to that shown in Fig. 1;

Fig. 4 is a fragmentary sectional view, taken along the line 4—4 in Fig. 3, showing the nut applied to a screw;

Fig. 5 is a plan view of another embodiment of the invention wherein the locking arm is reinforced at the free end thereof;

Fig. 6 is a side view of the nut shown in Fig. 5, with portions of the side walls broken away to disclose the body portion of the nut;

Fig. 7 is a fragmentary sectional view of the body portion of the nut in engagement with a screw, disclosing a preferred manner of forming the thread engaging surface portions of the nut;

Fig. 8 is a plan view of still another embodiment of the invention, wherein the locking arm is axially displaced from the remaining thread-engaging portion of the nut to facilitate starting of the nut on a screw;

Fig. 9 is a side view of the nut shown in Fig. 8 applied to a screw, with portions of the side walls of the nut broken away to reveal the manner in which the screw threads are engaged by the thread engaging portion of the nut;

Fig. 10 is a perspective view, in section, of the nut shown in Fig. 8, taken along the line 10—10 therein;

Fig. 11 is a sectional detail view showing the manner in which the locking arm is axially displaced from the remaining thread-engaging portion of a nut similar to that shown in Fig. 8; and Figs. 12 and 13 illustrate one method of producing the body portion of the nut disclosed herein.

Described briefly, the embodiment of the invention disclosed in Fig. 1 comprises a nut 20, having a central body portion 22 with a thread helix formed about the periphery of an aperture 24 therein. The body portion is provided with a slit 26 which extends radially and circumferentially only part way through and around the nut, the section of said body portion included between the slit and the aperture constituting an arcuate locking arm 28 which is adapted to flex radially outward, from position 27 to 27' shown in Fig. 1, and position itself circumferentially as an incident to the application of the nut on a screw, whereby the edge portion 27 of the arm 28 frictionally engages the threads of the screw 30 on which the nut is applied to provide a firm locking action and yet permit removal of the nut without the aid of special tools and without damage to the threads of the screw or the nut.

While the portion of the nut surrounding the central body portion 22 may be of various shapes to suit particular needs, the nut 20 has been illustrated as having upturned flange portions 29 (Fig. 1). Such a nut may readily be formed from a flat blank of polygonal outline having a serrated edge, as illustrated by the dot and dash lines in Fig. 1. The marginal portions of the blank are formed upwardly and constitute the side walls of the nut in the shape of a hexagon, whereby the nut is easily gripped and may be tightened or loosened with the aid of ordinary tools, such as sockets or end wrenches.

The central body portion 22 is preferably cup-shaped in order to provide a desired radial and axial stiffness for the thread helix formed therein about the periphery of the central aperture 24. When the locking arm 28 is formed from such a cup-shaped body portion of the nut, it too will have a desired radial and axial stiffness which can be readily controlled by variation of the shape of the cross section of such cupped portion. With a shallow cup portion, the radial stiffness will be noticeably greater than the axial stiffness, whereas with a deep cup portion, the axial stiffness will be proportionally increased and the radial stiffness proportionally decreased. Therefore, by varying the proportions of the radially extending to the axially extending portions of the transverse cross section of the arm 28 any desired degree of stiffness or flexibility may be obtained. Further, the stiffness or flexibility of the locking arm 28 may also be controlled by the thickness of the material of which it is formed, the elasticity thereof, and the circumferential extent of the locking arm, which extent is approximately 90° in the embodiment illustrated in Fig. 1. It is preferred to form the locking arm 28 so that its thread engaging portion 27 contacts the threads of a screw member to which the nut is applied over an arc of considerable extent, viz., 45° or more. This serves to distribute the frictional locking force over a considerable circumferential extent and thus minimizes wear of the threads and also prevents the locking arm from biting into the screw threads.

While it is generally preferred to form the locking arm 28 in such manner that it is flexed radially when the nut is applied to a screw, in certain instances it may be preferred to form the locking arm so that it is flexed in an axial direction, or is flexed in both axial and radial directions.

In Fig. 2, the nut 20 has been shown applied to a screw 30, which passes through openings in work members 32 and 32a. It will be noted that subsequent to the radial movement of arm 28 upon the application of the nut to the screw there is no further distortion of the central body portion 22, nor of the locking arm 28, as the clamping face 34 of the nut is brought into engagement with the adjacent work surface of member 32. Therefore, since the engaging surface of the nut 27 is not distorted relative to the threads of screw 30 as an incident to engagement of the nut with the work, the nut can always be readily removed from an engaged position without injury to the threads of the screw.

While the slit 26 in the body portion of the nut illustrated in Figs. 1 and 2 extends first in a radial direction from the aperture 24 to the lip of the cup and then circumferentially around the lip, it is to be understood that the slit may, if desired, extend radially and circumferentially in a spiral path.

In Figs. 3 and 4 there is illustrated a nut having a central body portion 22a similar to that shown in Fig. 1, but with a somewhat different shape of cup. As may best be seen in Fig. 4, the thread engaging portion of the cup extends radially outward from the screw 30a until it joins the upper end of a truncated cone portion 22a, which is formed outwardly at the base of the cone to form the face 34a of the nut 20a. Other features of the embodiment are similar to that shown in Figs. 1 and 2.

In the embodiment of the invention illustrated in Figs. 5 and 6, the slit 26b extends into an aperture 31, which is not connected to the aperture 24b in the central body portion of the nut 20. In close relation to aperture 31, a slot 33 is formed extending radially outward from aperture 24b, thus leaving a reinforcing portion 36 connecting the free end of locking arm 28b to the body portion 22b of the nut. This embodiment of the invention is particularly suitable when an unusually firm locking action is required and the thickness of the sheet material of which the nut is formed is insufficient to provide the requisite stiffness or rigidity in the locking arm 28b when constructed in the manner disclosed in Fig. 1.

In order to facilitate the application of the nut to a screw, it is sometimes desirable to delay the locking action until one or more threads of such screw have been engaged by the nut. One method of accomplishing this result has been illustrated in Figs. 8 to 11. In the embodiment of the invention illustrated by these figures, the thread-engaging portion 27c of the locking arm 28c is axially displaced from the remainder of the thread-engaging portion 25c of the cup-shaped body portion 22c of the nut 20c by a distance equal to the thread pitch of the screw 30c for which the nut is designed. Obviously, a displacement equal to a multiple of the distance between adjacent threads might likewise be employed, if desired.

One method of producing the improved form of nut disclosed herein is illustrated by Figs. 12 and 13. Fig. 12 shows the sheet of resilient material 21 after the first operation, wherein the central spiral-shaped aperture 24d is pierced and the slit 26d which comprises the arm portion 28d is formed by shearing or the like. The body portion 22d is next formed into a cup shape, as shown in Fig. 13, terminating in a thread helix about the aperture, as heretofore disclosed. While the method illustrated in Figs. 12 and 13 discloses the aperture 24d pierced in spiral shape to provide a thread engaging surface 27d for the arm member 28d, it should be noted that similar results can be obtained by piercing a circular hole and in the forming operation offsetting the arm 28d radially inwardly a desired distance, so as to provide the desired locking pressure upon application of the nut to a complementary screw.

In the embodiments of the invention illustrated herein, it is preferred that the thread-engaging surface portions of the cups 22, 22a, 22b and 22c, and the locking arms 28, 28a, 28b and 28c, have beveled edges 35, as has been illustrated in Fig. 7. This design provides an adequate surface area for frictional engagement on the threads of the screw, and minimizes wear of the engaging surfaces with repeated removal and replacement of the nut.

It will be apparent from the preceding description that a self-locking nut has been provided which can be economically manufactured of a resilient material such as sheet metal, which provides firm frictional locking engagement with a screw on which the nut is applied, and which may be removed and reapplied repeatedly without the aid of special tools. By reason of the fact that the locking arm engages the threads of the screw over an arc of substantial circumferential length, there is no tendency for the arm to bite into the threads of the screw for either direction of rotation of the nut. The nut is rendered particularly useful as a stop nut because the locking action is independent of pressures developed as an incident to the clamping of the nut against a work surface.

While the invention has been illustrated by the disclosure of particular embodiments thereof, it is to be understood that numerous other embodiments of the invention are possible; for example, a plurality of locking arms may be formed in the body portion of the nut about the periphery of the aperture. Therefore, it is to be understood that the invention is not limited to the specific structural details disclosed herein, but is capable of other modifications and changes without departing from the spirit and scope of the invention.

Having thus described the invention, what is claimed is:

1. A self-locking sheet metal nut comprising an outer radially extending base portion for clampingly engaging a work surface, a central abrupt extrusion presenting an annular wall projecting laterally of the base and terminating at its outer extremity in an annular section extending radially inwardly, said annular section having a central aperture defined by a helical screw accommodating margin, the annular wall in the vicinity of the base having a severance of circumferentially limited extent lying in a plane perpendicular to the nut axis, said circumferential severance communicating with a second severance substantially traversing said wall and annular section whereby to permit outward radial flexing of the severed portion of said extrusion as an incident to the application of a complementary screw member to the aforesaid helical margin, said circumferentially extending severance separating the wall from the plane of the adjacent surface of the base portion sufficiently to insure overlapping of said severed portion of the wall and base when a complementary screw member is associated with said helical margin.

2. A self-locking sheet metal nut in accordance with claim 1, in which the base portion is provided with peripheral flange means along the outer margin thereof to facilitate application of a turning force to the nut periphery.

3. A self-locking sheet metal nut in accordance with claim 1, wherein the helical screw accommodating margin is radially severed so as to present a plurality of helically disposed segmental sections.

CHARLES E. NAGEL.

REFERENCES CITED

The following references are of record in the file of this patent:

UNITED STATES PATENTS

| Number | Name | Date |
| --- | --- | --- |
| 861,844 | Hemmings | July 30, 1907 |
| 1,017,471 | Stahl | Feb. 13, 1912 |
| 1,334,359 | Dunn | Mar. 23, 1920 |
| 1,749,903 | Cannon | Mar. 11, 1930 |
| 2,213,353 | Whitcombe | Sept. 3, 1940 |
| 2,297,102 | Head | Sept. 29, 1942 |
| 2,347,852 | Thompson | May 2, 1944 |
| 2,379,892 | Eggert | July 10, 1945 |
| 2,382,936 | Bedford | Aug. 14, 1945 |

FOREIGN PATENTS

| Number | Country | Date |
| --- | --- | --- |
| 635,044 | France | Mar. 5, 1928 |